United States Patent [19]
Ahmadi et al.

[11] Patent Number: 5,477,530
[45] Date of Patent: Dec. 19, 1995

[54] METHOD AND APPARATUS FOR MANAGING COMMUNICATIONS BETWEEN MULTI-NODE QUOTA-BASED COMMUNICATION SYSTEMS

[75] Inventors: Hamid Ahmadi, Somers; Jeane S. Chen, Ossining; Krishna Arvind, Briarcliff; Ofek Yoram, Riverdale, all of N.Y.

[73] Assignee: International Business Machines Corporation, Armonk, N.Y.

[21] Appl. No.: 358,329

[22] Filed: Dec. 19, 1994

Related U.S. Application Data

[63] Continuation-in-part of Ser. No. 189,227, Jan. 31, 1994, abandoned.

[51] Int. Cl.[6] .............................. H04J 3/02; H04L 12/43; H04L 12/66
[52] U.S. Cl. .................. 370/16.1; 370/85.12; 370/85.13; 370/85.14; 370/94.1; 340/825.05
[58] Field of Search .............................. 370/16, 16.1, 54, 370/60, 60.1, 85.2, 85.3, 85.4, 85.5, 85.9, 85.11, 85.12, 85.13, 85.14, 85.15, 94.1, 94.3, 100.1, 105.2; 340/825.05, 825.06, 825.14, 825.2, 825.5, 825.51

[56] References Cited

U.S. PATENT DOCUMENTS

| | | | |
|---|---|---|---|
| 4,539,679 | 9/1985 | Bux et al. | 370/85.14 |
| 4,680,756 | 7/1987 | Sugimoto et al. | 370/85.14 |
| 4,710,915 | 12/1987 | Kitahara | 370/16.1 |
| 4,926,418 | 5/1990 | Cidon et al. | 370/85.5 |
| 5,245,605 | 9/1993 | Ofek | 370/85.12 |
| 5,278,823 | 1/1994 | Handel | 370/85.13 |
| 5,327,431 | 7/1994 | Heske, III et al. | 370/85.13 |

FOREIGN PATENT DOCUMENTS 0212940  9/1986  Japan .................. 370/85.14

*Primary Examiner*—Alpus Hsu
*Attorney, Agent, or Firm*—Heslin & Rothenberg

[57] ABSTRACT

First and second multi-node communication paths are connected via a bridge node. Each path employs a quota allocation scheme for access thereto by the nodes thereon. A first quota allocation signal is propagated on the first path and a second quota allocation signal is propagated on the second path, the second signal controlling access to the second path for the purpose of transmitting information to the bridge node destined for the first path. The quota allocation signals are synchronized to ensure that there is at most one circulation of the second quota allocation signal for each circulation of the first quota allocation signal. Information from the first path to the second path is deflected from the bridge node and around the first path if the bridge node is full. If the information is transmitted in sequenced packets, a deflected packet is assigned a deflection number. The bridge node tracks deflections via the deflection numbers.

32 Claims, 4 Drawing Sheets

METHOD AND APPARATUS FOR MANAGING COMMUNICATIONS BETWEEN MULTI-NODE QUOTA-BASED COMMUNICATION SYSTEMS

This application is a continuation-in-part of U.S. Application Ser. No. 08/189,227, filed Jan. 31, 1994, now abandoned.

BACKGROUND OF THE INVENTION

1. Technical Field

The present invention generally relates to the management of information between communication systems. More particularly, the present invention relates to information management between multi-node quota-based communication systems.

2. Background Art

Multi-node communication systems with a shared resource exist that employ some type of global fairness algorithm regulating node access to the shared resource. One example of such a system is the Metaring architecture, as disclosed in U.S. Pat. No. 4,926,418, entitled "Fairness Algorithm for Full-Duplex Buffer Insertion Ring" issued to Cidon et al. on May 15, 1990 and assigned to IBM (hereinafter referred to as "the Cidon patent"), which is herein incorporated by reference in its entirety. Global fairness, in terms of access to a shared metaring resource, circulates a hardware message called the "SAT" in the direction opposite the information traffic it regulates. In response to arrival of the SAT signal at a given node on the ring, a quota is allocated thereto allowing the node limited access to the ring and giving priority to ring traffic at any given node over its own transmissions.

When the Metaring structure consists of two or more distinct rings with an arbitrary topology, information exchange between the rings may be adversely affected by, for example, a difference in speed between the rings. A node that interconnects two rings is referred to as a switching or bridge node. When there is such a speed mismatch, or when one ring is bidirectional and the other is unidirectional, buffers in the bridge node of a bounded size may lose information without a flow control mechanism.

Proposed solutions to this problem have not permitted bounded buffer sizing and have required resequencing. Metaring transmits information in sequenced packets. If the packets get out of order, such as when a buffer is full momentarily, they must be resequenced or put back in their original order.

Thus, a need exists for information transfer control between multi-node communication paths allowing for bounded bridge node buffer sizing without information loss, preventing packet resequencing, tolerating speed mismatches between paths and allowing for different types of communication paths.

SUMMARY OF THE INVENTION

Briefly, the present invention satisfies the need for information flow management between multi-node communication paths with zero information loss by providing a management scheme incorporating multiple quota allocation signals and deflection routing.

In a first aspect of the present invention, a method for managing information flow between a first multi-node communication path and a second multi-node communication path through a bridge node is presented. Each communication path employs a quota allocation scheme for controlling access thereto by nodes thereon. A first quota allocation signal is propagated on the first communication path for controlling access thereto by the nodes thereon. In addition, a second quota allocation signal is propagated on the second communication path for controlling access thereto by the nodes thereon for transmitting information to the bridge node destined for the first communication path. The first and second quota allocation signals are synchronized for information flow from the second communication path to the first communication path. Finally, if information from the first communication path destined for the second communication path is currently unacceptable by the bridge node, the information is deflected.

Synchronization of the quota allocation signals may be accomplished by a two-part approach. The quota allocated to a given node on the first communication path in response to the first quota allocation signal is set equal to the total quota allocated to all the nodes on the second communication path in response to propagation of the second quota allocation signal once therethrough. The propagation of the second quota allocation signal is also limited such that for every complete propagation of the first quota allocation signal there is at most one complete propagation of the second quota allocation signal.

Where the information is transmitted via sequenced packets, each packet having a deflection indicator associated therewith for indicating whether a prior deflection thereof has occurred and an order therefor if so, a given packet may be deflected if currently unacceptable to the bridge node based on the deflection indicator. One situation where deflection may take place is where the bridge node is full with respect to that information type.

In a second aspect of the present invention, a bridge node operating in accordance with the above principles is provided. The bridge node includes a first buffer for buffering first information from a first multi-node communication path to a second multi-node communication path. Each communication path employs a quota allocation scheme for access thereto by the nodes thereon, the scheme for the second communication path controlling access for the purpose of transmitting information to the first path. The scheme for the second path also controls the release of the information in the first buffer onto the second path. The node includes a means for determining whether the first buffer is full with respect to the first information and a means for deflecting the first information onto the first path if so. The node also includes a second buffer for buffering information from the second path to the first path. In addition, the bridge node includes a means for accepting the first information and second information thereinto. Release of information from the second buffer onto the first path is controlled via the quota scheme employed thereby.

The present invention also includes a multi-node quota-based communication system utilizing the above principles and including a first and second multi-node communication path, a means for synchronizing a quota allocation signal propagated on each path, a bridge node with a first buffer for buffering information from the first path to the second path, a second buffer for buffering information from the second path to the first path and a means for determining whether information is acceptable by the first buffer.

These, and other objects, features and advantages of this invention will become apparent from the following detailed description of the various aspects of the invention taken in conjunction with the accompanying drawings.

BEST MODE FOR CARRYING OUT THE INVENTION

Figure 1:
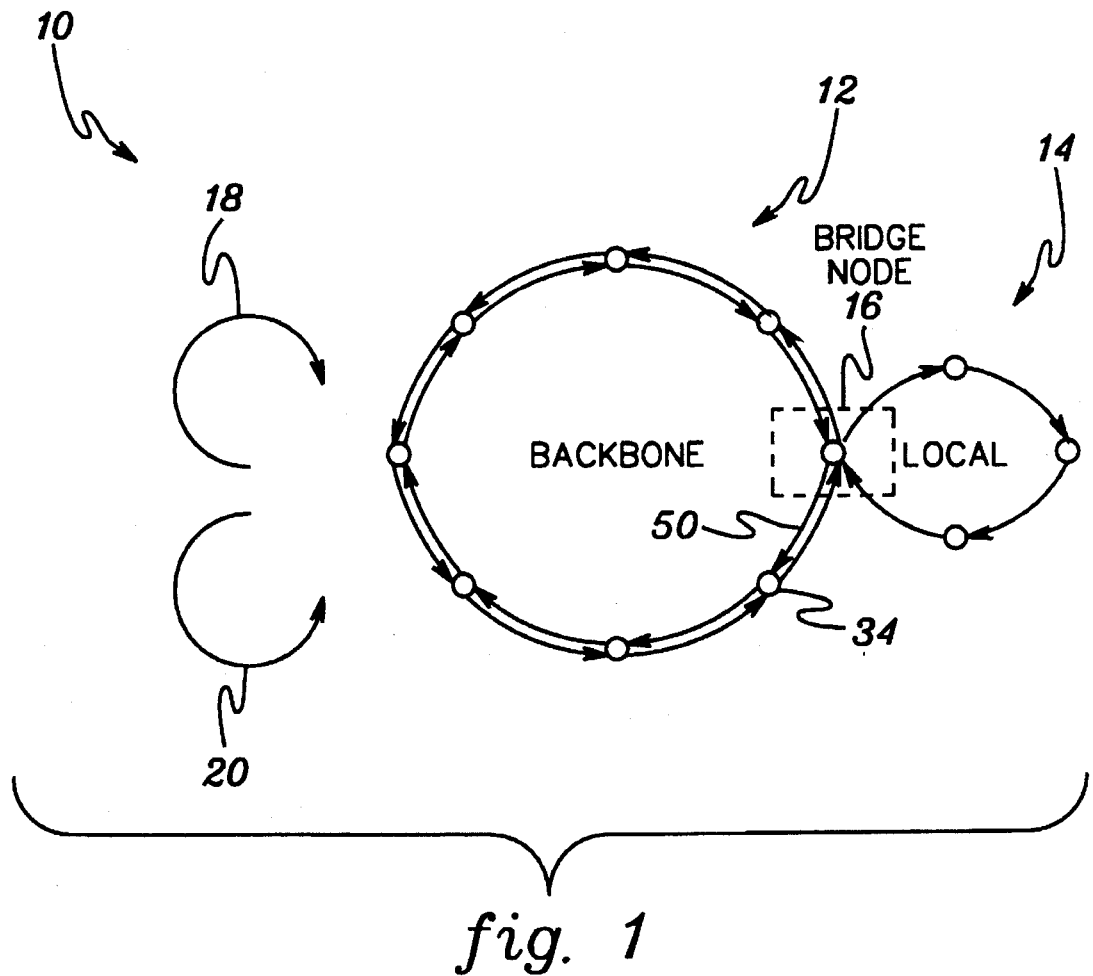
FIG. 1 depicts a bidirectional backbone ring interconnected with a unidirectional local ring by a bridge node in accordance with the present invention.

FIG. 1 depicts a multi-node communication system 10 having a Metaring architecture. Communication system 10 comprises a bidirectional backbone ring 12 and a unidirectional local ring 14, connected by bridge node 16 of a bounded size. Backbone ring 12 comprises a clockwise ring 18 and a counterclockwise ring 20.

Figure 2:
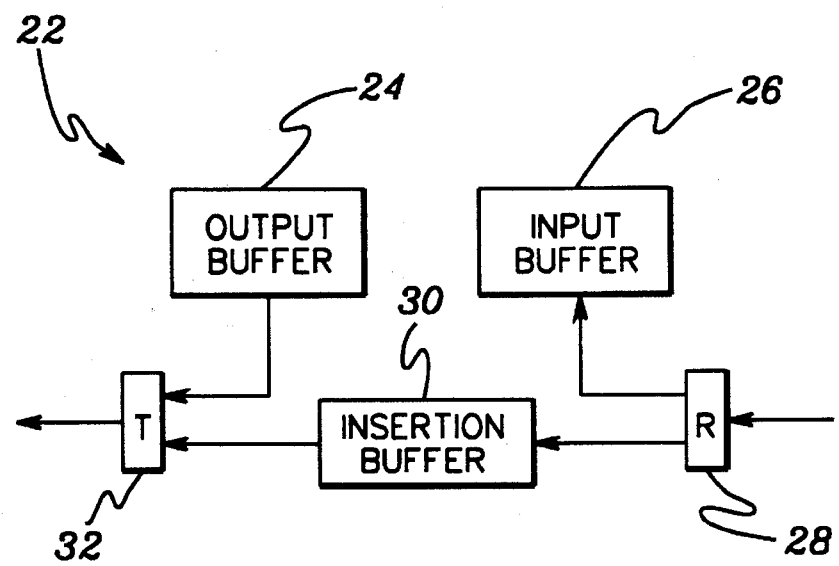
FIG. 2 depicts the basic node structure of each node, except the bridge node, in FIG. 1 repeated for each type of traffic travelling through a given node.

FIG. 2 depicts the basic structure 22 of a given node (except bridge node 16—see FIG. 3) in FIG. 1, operating under the buffer insertion technique known in the art. Structure 22 comprises output buffer 24, input buffer 26, receiver 28, insertion buffer 30 and transmitter 32. A given node has this structure for each type of traffic travelling through it. For example, node 34 on backbone ring 12 would have two such structures; one for clockwise traffic and one for counterclockwise traffic. If ring traffic arrives at a given node during a transmission via transmitter 32, the ring traffic is stored in insertion buffer 30 until the transmission is complete. If the ring traffic is destined for that node, it enters input buffer 26 directly from receiver 28. The node cannot begin a transmission until buffer 30 is empty; that is, a non-preemptive priority is given to ring traffic. If the node is idle, the ring traffic will not be held in buffer 30, but will pass directly therethrough.

A given node is allowed to transmit a number of information packets designated as Q between visits of the relevant SAT signal. After the SAT leaves a node, the node may transmit up to Q packets as long as the insertion buffer is empty. Once a node has transmitted Q packets, it cannot transmit any more packets of that class until refreshing its quota after the next SAT visit. If a node has not been able to transmit Q packets by the time the SAT arrives, usually due to excessive ring traffic, it will hold the SAT until exhausting its prior quota. An output buffer for a particular information type is said to be "SATisfied" when it has either exhausted its quota or its output buffer is empty. Under any other circumstance, the node is said to be not satisfied. For more details regarding the SAT signal and the operation of the nodes of FIG. 1, except bridge node 16, see the Cidon patent at column 4, line 24 to column 10, line 53, and in particular, FIGS. 2 and 12 referred to therein.

Figure 3:
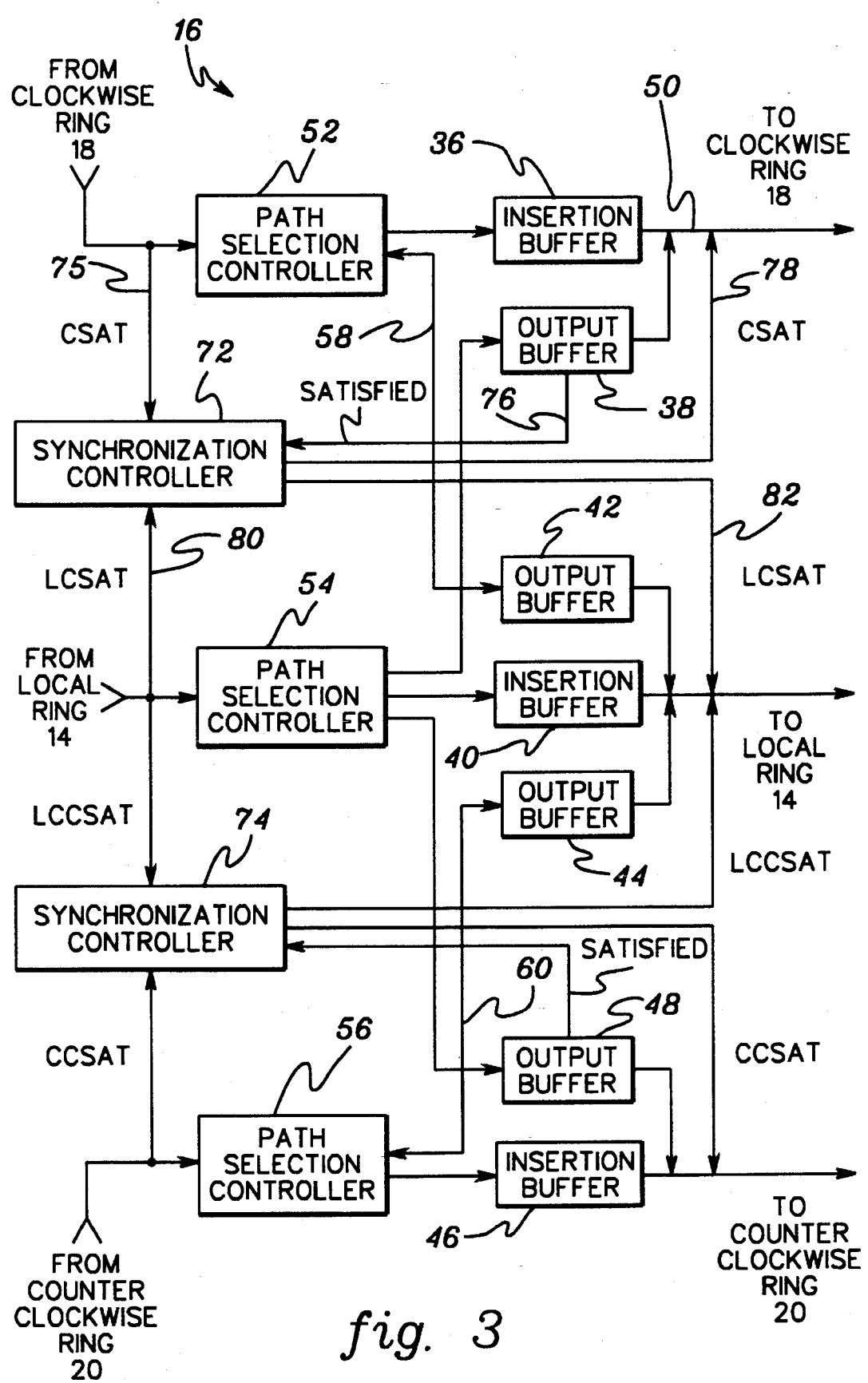
FIG. 3 depicts the structure of the bridge node of FIG. 1.

FIG. 3 depicts the structure of bridge node 16 in FIG. 1. Bridge node 16 comprises insertion buffer 36 and its associated output buffer 38, insertion buffer 40 and its associated output buffers 42 and 44, path selection controllers 52, 54 and 56, synchronization controllers 72 and 74 and insertion buffer 46 and its associated output buffer 48. Information traffic between backbone ring 12 and local ring 14 may need to be buffered at bridge node 16 in case the desired output link is not available, for example, link 50. Thus, bridge node 16 has four buffers, each buffer being responsible for storing one particular class of traffic. Specifically, the four classes of traffic are clockwise to local, counterclockwise to local, local to clockwise and local to counterclockwise. Insertion buffer 36 and output buffer 38 handle information traffic destined for clockwise ring 18 from both itself and local ring 14, respectively. Insertion buffer 40 handles all information traffic within local ring 14. Output buffer 42 handles information traffic from clockwise ring 18 to local ring 14 and output buffer 44 handles information traffic from counterclockwise ring 20 to local ring 14. Finally, insertion buffer 46 and associated output buffer 48 handle information traffic destined for counterclockwise ring 20 from both itself and local ring 14, respectively. Each insertion buffer in bridge node 16 has priority over its associated output buffer or buffers.

A SAT signal controls the amount of information traffic a particular node can transmit between visits of the SAT signal by allocating a quota thereto. Information traffic originating from a node in local ring 14 with a destination, apart from bridge node 16, within local ring 14 is controlled by a SAT signal referred to herein as "LLSAT". Traffic from local ring 14 destined for clockwise ring 18 is regulated by a second SAT signal referred to herein as "LCSAT". Likewise, traffic from local ring 14 to counterclockwise ring 20 is regulated by a third SAT signal "LCCSAT". Finally, traffic on clockwise ring 18 is controlled by a fourth SAT signal "CSAT" and traffic on counterclockwise ring 20 is controlled by a fifth SAT signal "CCSAT". From the point of view of backbone ring 12, local ring 14 is just another node (i.e., at bridge node 16) Thus, no dedicated SAT is needed for traffic from backbone ring 12 to local ring 14. Bridge node 16 can be thought of as being more a part of backbone ring 12 than local ring 14. The SAT signals on backbone ring 12 travel on the opposite ring to the traffic they regulate.

An overview of the management of information traffic from local ring 14 to clockwise ring 18 will now be given. It will be understood that the description of the management of information traffic from local ring 14 to counterclockwise ring 20 is similar. CSAT grants Q quota to bridge node 16, controlling the number of information packets of a predetermined size that can be transmitted from output buffer 38 between successive visits of LCSAT to bridge node 16 on local ring 14. Since output buffer 38 is only guaranteed Q quota between consecutive visits of CSAT to bridge node 16, we need to ensure that the information packet traffic coming into output buffer 38 does not exceed Q at any given time. This is accomplished by a two-prong mechanism. First, the CSAT and LCSAT signals are synchronized; that is, for every complete circulation of CSAT on clockwise ring 18, there is, at most, one circulation of LCSAT on local ring 14. Second, the sum of the quotas allocated by LCSAT to the nodes on local ring 14 is set equal to Q, so that the maximum traffic from local ring 14 is equal to the maximum that can be transmitted by output buffer 38 in the same time frame. In addition, it can be shown that the size of output buffer 38 needs to be no larger than twice Q. A particular implementation of this information management technique will subsequently be described in greater detail.

An overview of the information management technique of the present invention as it relates to traffic from clockwise ring 18 to local ring 14 will now be given. It will be understood that the description of the present invention as it relates to traffic from counterclockwise ring 20 to local ring 14 is similar. Since backbone ring 12 views bridge node 16 as any other node therein, the amount of information traffic from clockwise ring 18 to local ring 14 is bounded only by the sum of the quotas allocated by CSAT to the nodes of clockwise ring 18. This upper bound would take place if all nodes on clockwise ring 18 had full quota with information destined to local ring 14. In that case, output buffer 42 may overflow, even if it were very large, since local ring 14 is generally slower than clockwise ring 18, due mainly to the larger bandwidth of clockwise ring 18. Such an overflow is avoided through the use of deflection. When a packet from one ring destined for another encounters a full output buffer at the bridge node, the packet is circulated around the originating ring (or deflected) and will attempt to enter the bridge node when it returns. The packet will always be able to circulate, since ring traffic is given priority. Deflection also prevents other nodes from further clogging up the ring with additional traffic. An example of a way to accomplish these objectives will subsequently be described in greater detail.

A method for managing information traffic local to backbone ring 12 has previously been presented in the Cidon patent. The present invention concentrates on information traffic between rings. Thus, a method for managing information traffic from local ring 14 to clockwise ring 18 will now be described in detail.

The present method utilizes a status bit referred to herein as "SYNCc" which tracks the synchronization of CSAT with LCSAT as previously described. All information packets from local ring 14 arriving at bridge node 16 and destined for clockwise ring 18 are placed in output buffer 38. When CSAT arrives at synchronization controller 72 of bridge node 16 overliner 75, the bridge node holds it until output buffer 38 is satisfied, i.e., until previously allocated quota is exhausted or output buffer 38 is emptied, indicated by the issuance of a "SATisfied" flag from output buffer 38 to synchronization controller 72 over line 76. When CSAT leaves bridge node 16 from synchronization controller 72 over line 78, SYNCc is set to one. When LCSAT arrives at synchronization controller 72 of bridge node 16 over line 80, it is held until SYNCc equals one. Once SYNCc equals one, bridge node 16 releases LCSAT from synchronization controller 72 over line 82 and sets SYNCc to zero. Information traffic from local ring 14 to counterclockwise ring 20 is managed in the same manner synchronization controller 74.

Synchronization controllers 72 and 74 each preferably comprise a pair of state machines. Flow diagrams 84 and 86 in FIGS. 4 and 5, respectively, depict the functions of the pair of state machines for synchronization controller 72. It will be understood that the state machines for synchronization controller 74 are similar. One skilled in the art will know how to implement the state machines as described. Flow diagram 84 begins with an inquiry as to whether the CSAT signal has been received at bridge node 16 (INQUIRY 88, "RECEIVE CSAT AT BRIDGE NODE 16?"). Inquiry 88 repeats until the CSAT has been received, after which another inquiry is made as to whether output buffer 38 has issued the satisfied flag (INQUIRY 90, "OUTPUT BUFFER 38 SATISFIED?"). Inquiry 90 repeats until output buffer 38 is satisfied, at which time the SYNCc status bit is set to 1 (STEP 92 "SYNCc=1"). After setting the SYNCc status bit, the CSAT signal is forwarded by synchronization controller 72 onto ring 18 (STEP 94, "FORWARD CSAT ON RING 18"). After the CSAT signal is forwarded, flow diagram 84 returns to inquiry 88.

Flow diagram 86 begins with an inquiry as to whether the LCSAT signal has been received at bridge node 16 (INQUIRY 96, "RECEIVE LCSAT AT BRIDGE NODE 16?"). Inquiry 96 repeats until the LCSAT signal has been received, after which another inquiry is made as to whether the SYNCc status bit has been set to 1 (INQUIRY 98, "SYNCc= 1?"). Inquiry 98 repeats until the SYNCc status bit has been set to 1, at which time the SYNCc status bit is reset to 0 (STEP 100, "SYNCc= 0"). After resetting the SYNCc status bit, the LCSAT signal is forwarded by synchronization controller 72 onto ring 14 (STEP 102, "FORWARD LCSAT ON RING 14"). After forwarding the LCSAT signal, flow diagram 86 returns to inquiry 96.

The management of information traffic from clockwise ring 18 to local ring 14 will now be described in detail. This aspect of the present invention utilizes two counters: DEFLECTc tracks the number of packets that have been deflected and is initialized to zero; and ACCEPTc tracks the next deflected information packet in the sequence that will be accepted into output buffer 42 and is also initialized to zero. Information packets are sequenced; that is, they are arranged in a particular order when issued. The present aspect also utilizes a deflect field associated with each information packet to indicate an order of deflected packets. The deflect fields are normally zero, a non-zero field for a given packet indicating it has been deflected and in what order. If output buffer 42 is non-empty when LLSAT arrives at bridge node 16, LLSAT is held until buffer 42 is satisfied.

Output buffer 42 indicates it is full by sending a FULL flag to path selection controller 52 over bidirectional path 58. Similarly, output buffer 44 indicates it is full by sending such a flag to path selection controller 56 over bidirectional path 60. Output buffers 38 and 48 are assumed never to be full, thus, no FULL flag is received by path selection controller 54. If output buffer 18 is full when a packet from clockwise ring 18 destined for local ring 14 arrives, the packet's deflection field is examined. If the field is zero, DEFLECTc is incremented by one and the packet's deflection field is reset to equal DEFLECTc. The packet is then deflected once around clockwise ring 18. If the packet's deflection field is non-zero and the buffer is full, the packet is simply deflected. If DEFLECTc exceeds a predetermined maximum, the bridge node holds the CSAT signal until output buffer 42 is satisfied.

If output buffer 42 is not full when the packet arrives, the packet is accepted into buffer 42 if its deflection field matches the value of ACCEPTc. If the field matches ACCEPTc and ACCEPTc is non-zero, ACCEPTc is incremented by one. After incrementing ACCEPTc, it is compared to DEFLECTc; if ACCEPTc is greater than the current value of DEFLECTc, both counters are reset to zero. If ACCEPTc does not match the deflection field, it is compared thereto to determine if the field is greater (the deflection field can never be smaller); if so, the packet is deflected. Where no deflection takes place, ACCEPTc and a given packet's deflection field will always match, since they are both zero in the absence of deflection. The management of information traffic from clockwise ring 18 to local ring 14 as described above is accomplished by path selection controller 52. It will be understood that controllers 54 and 56 are similar. One skilled in the art will understand that the management functions as described herein may be accomplished by any number of hardware component combinations.

It will be understood that the information management methods described above with respect to information from local ring 14 to clockwise ring 18 and vice-versa are similar for information from local ring 14 to counterclockwise ring 20 and vice-versa, respectively.

The management of information traffic between backbone ring 12 and local ring 14, as described above, is accomplished by path selection controllers 52, 54 and 56 in FIG. 3. For example, with respect to information traffic from clockwise ring 18 to local ring 14, path selection controller 52 determines whether information coming from clockwise ring 18 will be deflected back to clockwise ring 18 or sent on to local ring 14 via output buffer 42 based on whether a signal from output buffer 42 (a FULL flag) is received over bidirectional path 58 indicating output buffer 42 is full. One skilled in the art will recognize output buffers issuing such signals.

Figure 6:
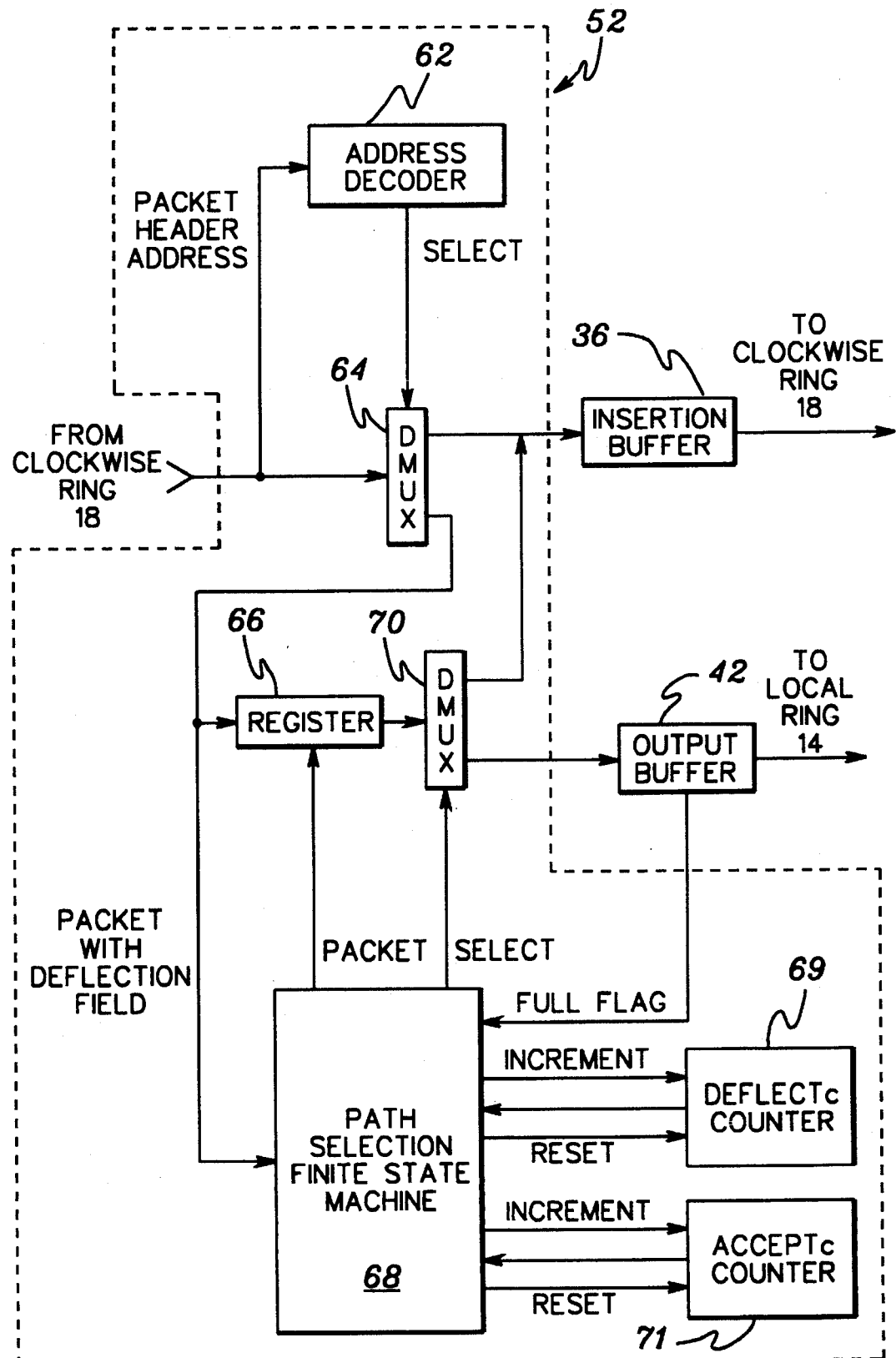
FIG. 6 depicts a path selection controller within a bridge node according to the present invention.

One example of an implementation of path selection controllers 52, 54 and 56, is presented in FIG. 6. Shown in FIG. 6 is one possible implementation for path selection controller 52. It will be understood that path selection controllers 54 and 56 would be similar a description of the operation of path selection controller 52 will now be provided.

As an information packet arrives at path selection controller 52 from clockwise ring 18, the packet header address is decoded by address decoder 62, the output of which acts as a select signal for demultiplexer 64. Based on the select signal, demultiplexer 64 sends the information packet either to insertion buffer 36 (the information is intended for another node on clockwise ring 18) or to register 66 and path selection finite state machine 68 (the information is intended for local ring 14). Based on whether output buffer 42 sends a FULL flag to finite state machine 68, and the status of the Deflectc and Acceptc counters 69 and 71, respectively, and the deflection field of the information packet, finite state machine 68 determines whether the information packet is sent to insertion buffer 36 (deflection) or output buffer 42 (transmission to local ring 14). In accordance with the description of the management of information traffic between local ring 14 and the clockwise ring 18, the path selection finite state machine 68 may alter the deflection field of the information packet prior to sending it to register 66. In any case, the information packet is sent to register 66 for supplying to demultiplexer 70. Based on a select signal issued from finite state machine 68, demultiplexer 70 sends the information packet to either insertion buffer 36 for deflection, or to output buffer 42 for transmission to local ring 14.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

We claim:

1. A method for managing information flow between a first multi-node communication path and a second multi-node communication path through a bridge node joining said first communication path and said second communication path, each said communication path employing a quota allocation scheme for controlling access thereto, said method comprising the steps of:

propagating a first quota allocation signal among nodes on said first communication path for controlling access to said first communication path by said nodes thereon;

propagating a second quota allocation signal among nodes on said second communication path for controlling access to said second communication path by said nodes thereon for transmitting information to said bridge node destined for said first communication path;

synchronizing said first quota allocation signal and said second quota allocation signal for said information flow from said second communication path to said first communication path; and deflecting information from said first communication path destined for said second communication path if said information is currently unacceptable by said bridge node.

2. The information management method of claim 1, wherein said step of synchronizing comprises:

allocating a quota to a given node on said first communication path in response to said first quota allocation signal that is equal to a total quota allocated to all nodes on said second communication path in response to a complete propagation of said second quota allocation signal through all nodes on said second communication path; and limiting propagation of said second quota allocation signal such that for every complete propagation of said first quota allocation signal there is at most one complete propagation of said second quota allocation signal.

3. The information management method of claim 2, wherein said step of limiting comprises:

setting a synchronization (SYNC) counter to a first predetermined number in response to said first quota allocation signal leaving said bridge node;

holding said second quota allocation signal at said bridge node upon arrival thereof until said SYNC counter is set to said first predetermined number; and releasing said second quota allocation signal from said bridge node and setting said SYNC counter to a second predetermined number in response to setting said SYNC counter to said first predetermined number.

4. The information management method of claim 1, wherein said step of synchronizing comprises:

holding said first quota allocation signal at said bridge node upon arrival thereof until said bridge node is satisfied with respect to information from said second communication path to said first communication path, wherein a condition of satisfied is characterized by either having exhausted all prior quota allocated in response to said first quota allocation signal or having transmitted all prior information from said second communication path destined for said first communication path; and accepting all information from said second communication path destined for said first communication path into said bridge node.

5. The information management method of claim 1, wherein said information flow is transmitted via sequenced information packets and wherein said step of deflecting comprises deflecting a given information packet upon attempting to enter said bridge node if said given information packet is currently unacceptable by said bridge node.

6. The information management method of claim 5 wherein said step of deflecting said given information packet comprises determining whether said bridge node is currently at capacity with respect to information from said first communication path destined for said second communication path.

7. The information management method of claim 6, wherein said bridge node is determined to be currently below said capacity, wherein said given information packet is associated with a deflection indicator for indicating whether a previous deflection thereof has occurred and an order therefor if so and wherein said step of deflecting said given information packet further comprises:

determining if said given information packet is currently acceptable by said bridge node based on said associated deflection indicator;

accepting said given information packet into said bridge node for transmission onto said second communication path if said given information packet is determined to be currently acceptable by said bridge node; and deflecting said given information packet if determined to be currently unacceptable by said bridge node.

8. The information management method of claim 6, wherein said bridge node is determined to be currently at said capacity, and wherein said step of deflecting said given information packet further comprises deflecting said given information packet in response to said determination.

9. A method for managing information flow from a multi-node unidirectional communication ring to a first ring of a multi-node bidirectional communication ring through a bridge node joining said unidirectional communication ring and said bidirectional communication ring, each said communication ring employing a quota allocation scheme for controlling access thereto, said method comprising the steps of:

circulating a first quota allocation signal among nodes on said bidirectional communication ring for controlling access to said first ring by nodes thereon;

circulating a second quota allocation signal among nodes on said unidirectional communication ring for controlling access to said unidirectional communication ring by nodes thereon for transmitting information to said bridge node destined for said first ring; and synchronizing said first quota allocation signal and said second quota allocation signal such that for each complete circulation of said first quota allocation signal there is at most one complete circulation of said second quota allocation signal, wherein a first quota allocated to a given node on said first ring in response to said first quota allocation signal is equal to a total quota allocated to all nodes on said unidirectional communication ring in response to a complete circulation of said second quota allocation signal.

10. The information management method of claim 9, wherein said step of synchronizing comprises:

holding said first quota allocation signal at said bridge node upon arrival thereof until said bridge node is satisfied with respect to said information, wherein a condition of satisfied is characterized by either having exhausted all prior quota allocated in response to said first quota allocation signal or having transmitted all prior said information; and accepting all said information into said bridge node.

11. The information management method of claim 9, wherein said step of synchronizing comprises:

setting a synchronization (SYNC) counter to a first predetermined number in response to said first quota allocation signal leaving said bridge node;

holding said second quota allocation signal at said bridge node upon arrival thereof until said SYNC counter is set to said first predetermined number; and releasing said second quota allocation signal from said bridge node and setting said SYNC counter to a second predetermined number in response to setting said SYNC counter to said first predetermined number.

12. A method for managing information flow from a first ring of a multi-node bidirectional communication ring to a multi-node unidirectional communication ring through a bridge node joining said bidirectional communication ring and said unidirectional communication ring, each said communication ring employing a quota allocation scheme for controlling access thereto, said method comprising the steps of:

circulating a first quota allocation signal among nodes on said bidirectional communication ring for controlling access to said first ring by nodes thereon, wherein at least one node on said first ring has information destined for said unidirectional communication ring;

circulating a second quota allocation signal among nodes on said unidirectional communication ring for controlling access to said unidirectional communication ring by nodes thereon; and deflecting said information around said first ring if said information is currently unacceptable by said bridge node, wherein said information is deflected upon each attempt to enter said bridge node until said information is acceptable.

13. The information management method of claim 12, wherein said information is transmitted via sequenced information packets, each of said sequenced information packets having a deflection indicator associated therewith for indicating whether a previous deflection thereof has occurred and an order therefor if so, and wherein said step of deflecting comprises deflecting a given information packet upon attempting to enter said bridge node if said given information packet is currently unacceptable by said bridge node based on said deflection indicator.

14. The information management method of claim 12, wherein said information is transmitted via sequenced information packets and wherein said step of deflecting a given information packet comprises:

determining whether said bridge node is currently at capacity with respect to said sequenced information packets; and deflecting said given information packet around said first ring if said bridge node is determined to be currently at said capacity.

15. The information management method of claim 12 further comprising the step of holding said second quota allocation signal at said bridge node upon arrival thereof until said bridge node is satisfied with respect to said information, wherein a condition of satisfied is characterized by either currently being without quota remaining from an immediately previous visit of said second quota allocation signal or currently without any prior said information.

16. A method for managing information flow from a first path of a multi-node bidirectional communication path to a second multi-node communication path through a bridge node joining said bidirectional communication path and said second communication path, each said communication path employing a quota allocation scheme for controlling access thereto, wherein said information is arranged in sequenced information packets, each of said sequenced information packets having a deflection field initialized to an initial value associated therewith, said method comprising the steps of:

propagating a first quota allocation signal among nodes on said bidirectional communication path for controlling access to said first path thereby, wherein at least one node on said first path has a plurality of sequenced information packets destined for said second communication path;

propagating a second quota allocation signal among nodes on said second communication path for controlling access to said second communication path thereby;

examining said associated deflection field for a given information packet upon an attempt thereby to enter said bridge node, wherein said deflection field indicates whether said given information packet has been deflected; and determining whether said bridge node is currently at capacity with respect to said plurality of sequenced information packets.

17. The information management method of claim 16, wherein said bridge node is determined to be currently at said capacity, said method further comprising the steps of:

initializing a DEFLECT counter for counting a number of said plurality of information packets that are deflected;

incrementing said DEFLECT counter and then setting said deflection field associated with said given information packet equal to said DEFLECT counter if said associated deflection field equals said initial value upon said attempt thereby to enter said bridge node;

deflecting said given information packet; and incrementing said DEFLECT counter.

18. The information management method of claim 17 further comprising the step of holding said first quota allocation signal at said bridge node upon arrival thereof until said bridge node is satisfied with respect to said plurality of information packets if said DEFLECT counter exceeds a predetermined maximum.

19. The information management method of claim 16, wherein said bridge node is determined to be currently at said capacity, said method further comprising the step of deflecting said given information packet if said associated deflection field equals a value other than said initial value.

20. The information management method of claim 16, wherein said bridge node is determined to be currently under said capacity, said method further comprising the steps of:

initializing an ACCEPT counter for tracking a next acceptable information packet;

accepting said given information packet into said bridge node and incrementing said ACCEPT counter if said associated deflection field equals said ACCEPT counter;

determining whether said ACCEPT counter is greater than a deflection counter indicating a number of said plurality of sequenced information packets previously deflected if said ACCEPT counter is incremented;

reinitializing said ACCEPT counter if said ACCEPT counter is determined to be greater than said deflection counter; and deflecting said given information packet if said ACCEPT counter fails to be determined to be greater than said deflection counter.

21. The information management method of claim 20 further comprising the step of holding said first quota allocation signal at said bridge node upon arrival thereof until said bridge node is satisfied with respect to said plurality of sequenced information packets if said deflection counter exceeds a predetermined maximum.

22. A bridge node for providing information exchange between a first multi-node communication path and a second multi-node communication path, said first multi-node communication path employing a quota allocation scheme for access thereto by nodes thereon, and said second multi-node communication path employing a quota allocation scheme for access thereto by nodes thereon for transmitting information to said first multi-node communication path, said bridge node comprising:

a first buffer for buffering first information from said first multi-node communication path to said second multi-node communication path, said first buffer releasing said first information onto said second multi-node communication path in accordance with said quota allocation scheme employed by said second multi-node communication path;

means for determining whether said first buffer is currently at capacity with respect to said first information;

means for deflecting said first information onto said first communication path if said first buffer is determined to be currently at said capacity;

a second buffer for buffering second information from said second multi-node communication path to said first multi-node communication path, said second buffer releasing said second information onto said first multi-node communication path in accordance with said quota allocation scheme employed by said first multi-node communication path; and means for accepting said first information and said second information into said bridge node.

23. The bridge node of claim 22, wherein said first multi-node communication path comprises a bidirectional communication ring including a first ring and a second ring, and wherein said second multi-node communication path comprises a unidirectional communication ring, said bridge node further comprising:

a third buffer for buffering third information from said second ring to said unidirectional communication ring; and a fourth buffer for buffering fourth information from said unidirectional communication ring to said second ring, wherein said first buffer buffers information from said first ring to said unidirectional communication ring and said second buffer buffers information from said unidirectional communication ring to said first ring, wherein said quota allocation scheme employed by said first multi-node communication path comprises a first quota allocation signal controlling said first information and a second quota allocation signal controlling said third information, and wherein said quota allocation scheme employed by said second multi-node communication path comprises a third quota allocation signal controlling said second information and a fourth quota allocation signal controlling said fourth information.

24. The bridge node of claim 22, wherein said first information comprises a sequence of information packets, each of said sequence of information packets being associated with a deflection field for indicating whether deflection thereof has previously occurred and in order therefor if so and wherein said deflecting means comprises means for examining and interpreting said deflection field associated with a given information packet attempting to enter said bridge node.

25. The bridge node of claim 24, wherein said deflecting means deflects said given information packet in response to said examining and interpreting means interpreting said associated deflection field as indicating a previous deflection of said given information packet.

26. The bridge node of claim 25, wherein said deflecting means further comprises means for altering said associated deflection field to indicate deflection of said given information packet.

27. The bridge node of claim 22, wherein said quota allocation scheme employed by said first multi-node communication path allocates a first quota to a given node on said first multi-node communication path expressed as an amount of information that may be transmitted thereby, and wherein said second buffer has a capacity of twice said first quota allocated to said bridge node.

28. The bridge node of claim 22, wherein said determining means, said deflecting means and said accepting means comprise a path selection controller.

29. A multi-node quota-based communication system, comprising:

a first multi-node communication path employing a quota allocation scheme, wherein a first quota allocation signal is propagated on said first multi-node communication path for controlling access thereto by nodes thereon;

a second multi-node communication path employing a quota allocation scheme, wherein a second quota allocation signal is propagated on said second multi-node communication path for controlling access thereto by nodes thereon for transmitting information destined for said first multi-node communication path;

means for synchronizing said first quota allocation signal and said second quota allocation signal such that said second quota allocation signal is propagated at most once through all nodes on said second multi-node communication path during a propagation of said first quota allocation signal through all nodes on said first multi-node communication path; and a bridge node joining said first multi-node communication path and said second multi-node communication path for providing information exchange therebetween, wherein said information is transmitted via sequenced information packets, said bridge node comprising:

a first buffer for buffering first sequenced information packets from said first multi-node communication path to said second multi-node communication path;

means for determining whether a given first information packet is currently acceptable by said first buffer; and a second buffer for buffering second sequenced information packets from said second multi-node communication path to said first multi-node communication path.

30. The multi-node quota-based communication system of claim 29, wherein each of said first sequenced information packets and said second sequenced information packets is associated with a deflection field indicating whether a given information packet was previously deflected and an order therefor if previously deflected, and wherein said determining means comprises:

means for determining whether said first buffer is currently full;

means for determining whether said deflection field associated with said given first information packet indicates a previous deflection thereof;

means for accepting said given first information packet into said first buffer if said associated deflection field indicates no previous deflection thereof and said first buffer fails to be determined to be currently full;

means for deflecting said given first information packet onto said first multi-node communication path if said first buffer is determined to be currently full; and means for assigning said order to said given first information packet if said first buffer is determined to be currently full and said associated deflection field indicates no previous deflection thereof.

31. The multi-node quota-based communication system of claim 29, wherein said synchronizing means comprises a synchronization controller.

32. The multi-node quota-based communication system of claim 29, wherein said determining means comprises a path selection controller.

\* \* \* \* \*

UNITED STATES PATENT AND TRADEMARK OFFICE
CERTIFICATE OF CORRECTION

PATENT NO. : 5,477,530
DATED : December 19, 1995
INVENTOR(S) : Ahmadi et al.

Figure 4:
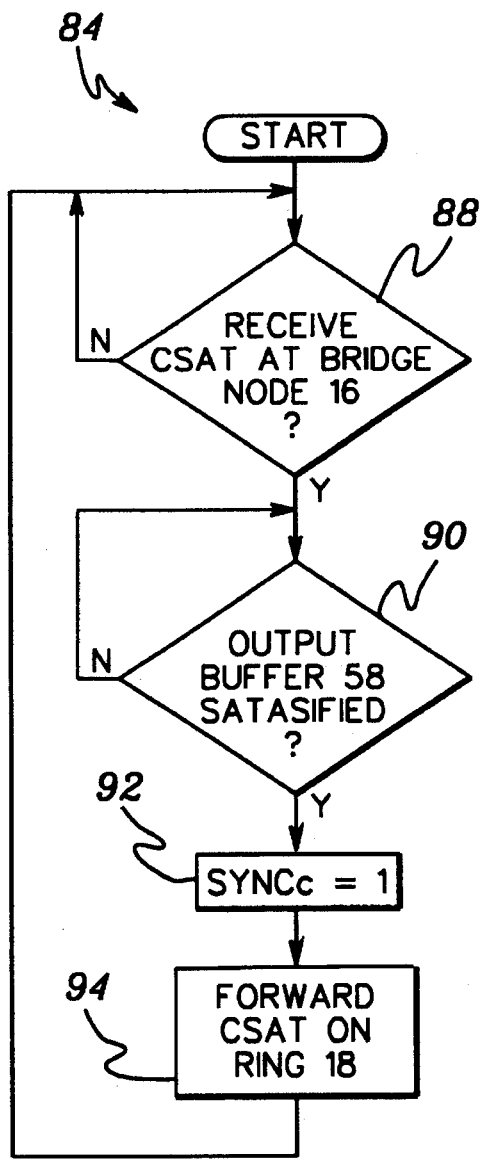
FIG. 4 is a flow diagram for a state machine function in a synchronization controller within a bridge node according to the present invention.
Figure 5:
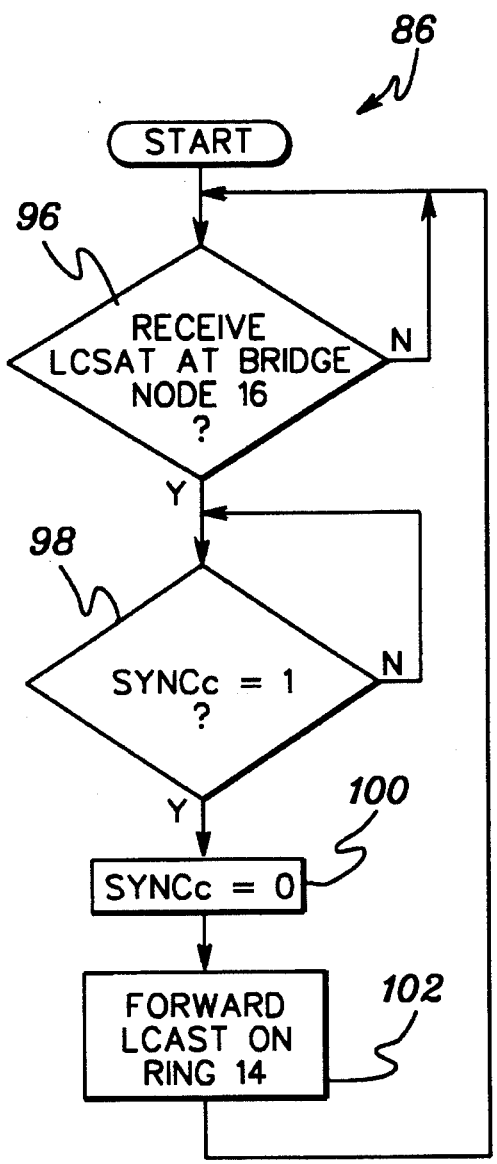
FIG. 5 is a flow diagram for another state machine function in the synchronization controller.

It is certified that error appears in the above-indentified patent and that said Letters Patent is hereby corrected as shown below:

In the Drawings:

FIG. 4, Box 90, delete "SATASIFIED" and replace with --SATISFIED--

Title page, item
[75] Inventors: delete "Krishna Arvind" and replace with --Arvind Krishna-- delete "Ofek Yoram" and replace with --Yoram Ofek--

Title page, item [57], Abstract:
[57] Abstract

Line 3 - line 4, delete "A first" and replace with --First--

Line 4, delete "path" and replace with --paths--

Signed and Sealed this

Ninth Day of April, 1996

*Attest:*

BRUCE LEHMAN

*Attesting Officer*    Commissioner of Patents and Trademarks